US009352818B2

(12) United States Patent
Reese

(10) Patent No.: US 9,352,818 B2
(45) Date of Patent: May 31, 2016

(54) OUTBOARD MARINE MOTOR ASSEMBLY AND CONVERSION KIT

(71) Applicant: Kenneth C. Reese, Orlando, FL (US)

(72) Inventor: Kenneth C. Reese, Orlando, FL (US)

( * ) Notice: Subject to any disclaimer, the term of this patent is extended or adjusted under 35 U.S.C. 154(b) by 206 days.

(21) Appl. No.: 14/177,355

(22) Filed: Feb. 11, 2014

(65) Prior Publication Data

US 2015/0225055 A1  Aug. 13, 2015

(51) Int. Cl.
*B63H 20/06* (2006.01)
*B63H 20/00* (2006.01)
*A01D 42/00* (2006.01)

(52) U.S. Cl.
CPC .............. *B63H 20/007* (2013.01); *A01D 42/00* (2013.01); *B63H 20/06* (2013.01); *Y10T 29/49012* (2015.01)

(58) Field of Classification Search
CPC .............................. B63H 20/00; A01D 34/416
See application file for complete search history.

(56) References Cited

U.S. PATENT DOCUMENTS

| 3,740,780 | A | * | 6/1973 | Knipple | B63H 16/04 114/364 |
|---|---|---|---|---|---|
| 4,569,663 | A | * | 2/1986 | Miller | B63H 20/007 114/153 |
| 4,976,637 | A | | 12/1990 | Newell et al. | |
| 5,405,277 | A | * | 4/1995 | Stalker | B63H 20/00 440/49 |
| 5,845,757 | A | * | 12/1998 | Csonka | B27B 17/10 192/105 BA |
| 6,406,340 | B1 | * | 6/2002 | Fetchko | B63H 20/12 440/61 C |
| 2005/0118897 | A1 | * | 6/2005 | Jackson | B63H 16/20 440/30 |

* cited by examiner

*Primary Examiner* — Edwin Swinehart
(74) *Attorney, Agent, or Firm* — Husch Blackwell LLP

(57) ABSTRACT

An outboard trolling marine motor assembly, conversion kit and method for converting a string trimmer into an outboard motor assembly. The assembly and kit featuring a propeller, a clamp assembly, a spacer and a mounting bracket. The propeller having a plurality of blades radially extending from a centrally located hub featuring a substantially centered non-circular recess. The propeller and spacer suitable for being mounted to a non-cylindrical prop-shaft. The clamp having a U-bolt with spaced apart threaded ends, fasteners and a block with a semi-circular slot and a plurality of apertures for receiving the ends of the U-bolt. Slot and U-bolt forming a substantially annular interior region. The mounting bracket having a pivotable body and at least one adjustable clamp for securing the motor assembly to a portion of a watercraft.

16 Claims, 6 Drawing Sheets

OUTBOARD MARINE MOTOR ASSEMBLY AND CONVERSION KIT

FIELD OF THE INVENTION

Embodiments of the subject application pertain to an outboard trolling motor assembly for use with a marine vessel and a conversion kit. More particularly, the embodiments disclosed herein are directed to an assembly and method for converting a string trimmer into an outboard marine trolling motor.

BACKGROUND

Commonly, outdoor enthusiasts including boaters, sportsmen, and fishermen use dinghies, rowboats or other small watercraft that can be propelled across the water by a small outboard marine trolling motor. Typically, such outboard motors depending on the size, horsepower and other features (e.g., transmission, propeller, fuel management system, anti-corrosion measures) can cost several hundred to several thousands of dollars. In certain instances, however, individuals only need a simple light-duty trolling motor that is inexpensive and easy to transport and operate. Thus, there is a need for an economical, durable and reliable mechanism for propelling small watercraft.

String trimmers or "weed-whackers" are generally well-known lawn care devices which are commonly used to for cutting or trimming grass, plants or shrubs. Typically, these devices consist of an elongated shaft connecting a small internal combustion or electric engine to a cutting head having a flexible monofilament line or other cutting device connected to a rotating hub or reel. Due to the relative simplicity of such devices, they are generally inexpensive and have become common household appliances.

In light of the foregoing, it has become generally known in the art to use a converted string trimmer as an outboard trolling motor. Such known equipment and methods, however, have a number of limitations, including, for example, attachment integrity issues between the propeller and the drive shaft and a tendency to burn out the clutch. String trimmers, for instance, commonly have a centrifugal clutch between the motor and attachment drive shaft. Thus, a propeller must be properly sized, balanced and configured, or the clutch can burn up. In addition, attachment of the propeller must be secure otherwise under dynamic loads the propeller can break loose. Known equipment and methods fail to sufficiently accommodate for such issues.

There is thus a need in the art for a conversion kit and method that can economically transform a string trimmer into an outboard marine motor. There is further a need that the outboard motor produced by such kit and method be reliable and durable such that the components of the kit will properly function together with the components of the modified string trimmer.

DETAILED DESCRIPTION

Figure 1:
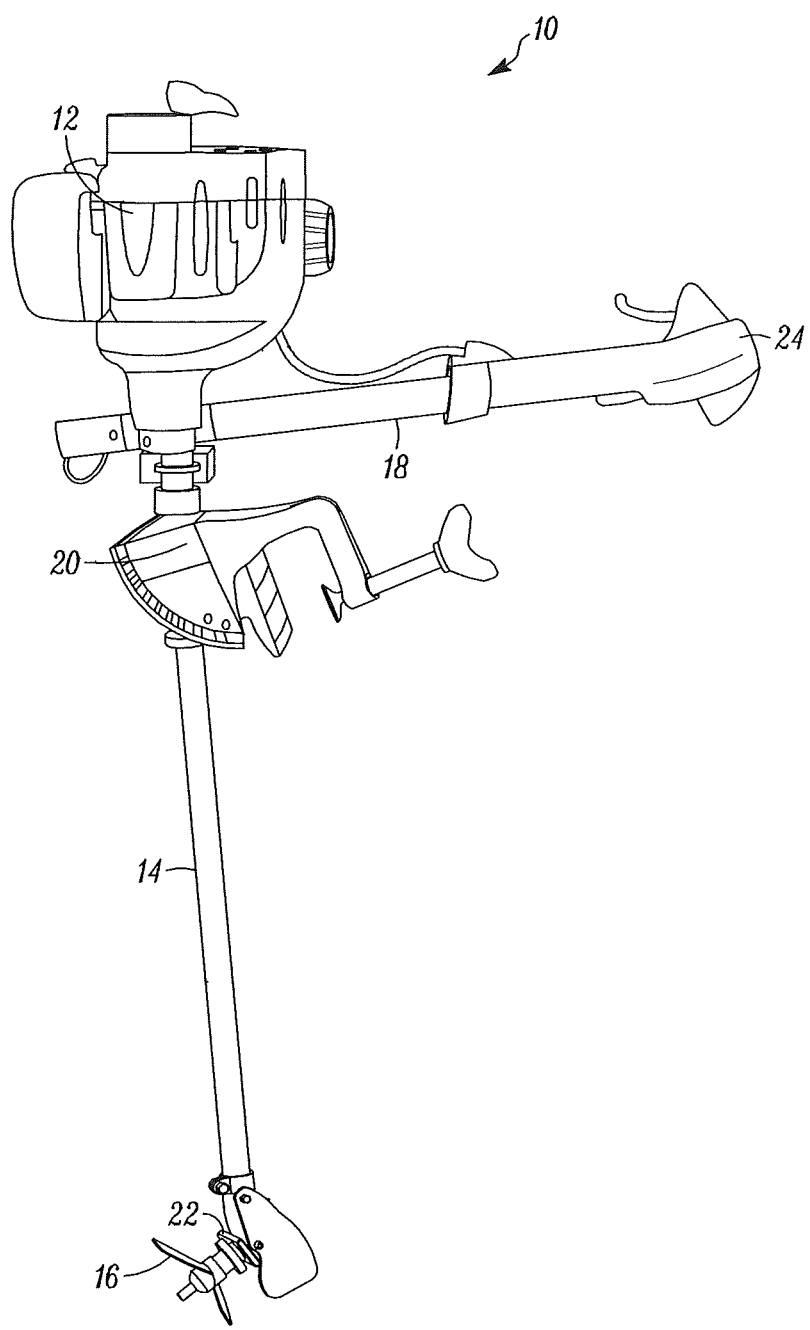
FIG. 1 is a perspective view of an assembled outboard motor assembly according to embodiments disclosed herein.
Figure 1A:
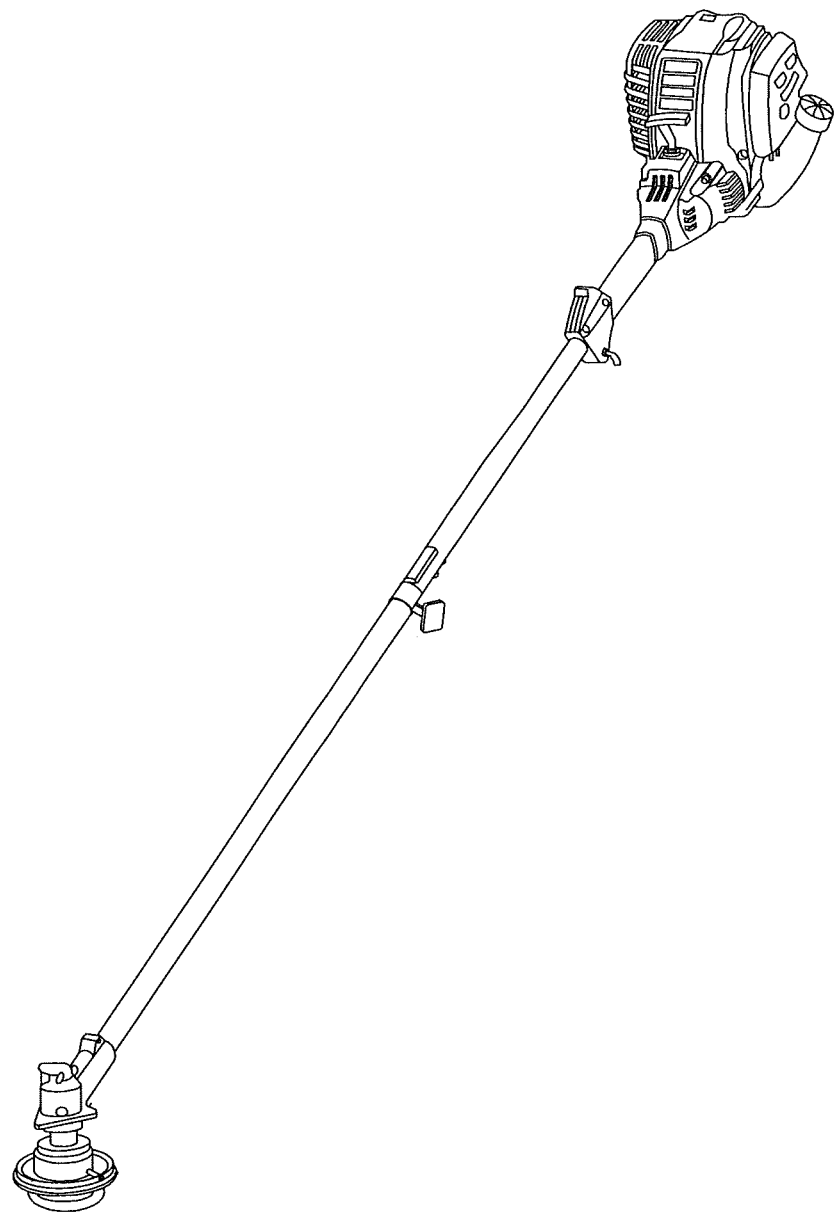
FIG. 1A is a perspective view of an example of a conventional string trimmer known in the art.

While disclosed embodiments can take many different forms, specific embodiments hereof are shown in the drawings and will be described herein in detail with the understanding that the present disclosure is to be considered as an exemplification of the principles hereof, as well as the best mode of practicing same, and is not intended to limit the claims hereof to the specific embodiment illustrated.

As described more fully herein, embodiments of the subject invention are directed to an outboard marine trolling motor assembly, a conversion kit for assembling said motor assembly from a string trimmer and method of performing such conversion to build a trolling motor assembly. It will be recognized that such embodiments can be highly advantageous to individuals by providing a simple light-duty trolling motor that can be less expensive than many standard commercially available outboard marine motors. It will be further recognized that such embodiments can provide a more reliable and durable motor assembly and thus are generally an improvement over known conversion equipment and methods.

With reference now to the accompanying figures, FIG. 1 illustrates an assembled outboard motor assembly 10 converted from a string trimmer according to embodiments disclosed herein. As illustrated in FIG. 1, the outboard motor assembly 10 can feature a small internal combustion or electric engine 12, an elongated drive shaft 14, a propeller 16, a steering shaft 18 and a motor mounting bracket 20. The engine 12 can be of the type typically provided as part of a string trimmer and can be gasoline or electrically powered. As described further herein, the drive shaft 14 and steering shaft 18 can be converted from portions of the elongated shaft of a string trimmer which is typically a two-part telescoping rod with a centrally located shaft housed inside a protective outer tube or sleeve. The unit 10 can alternatively be fabricated using a single piece non-split shaft by cutting the single piece shaft into two pieces to create the lower drive shaft 14 and steering shaft 18.

The engine 12 can be coupled to a first end of the drive shaft 14 with the second opposite end of the drive shaft 14 having a gear box assembly 22 featuring a transverse prop-shaft 58 in which the propeller 16 can be mounted. As illustrated in FIG. 1, the steering shaft 18 can be mounted to the drive shaft 14 proximate the first end of the drive shaft 14, adjacent the engine 12. The steering shaft 18 can have first and send ends and a throttle control unit 24 mounted to the second end. As described more fully herein, the throttle control unit 24 can be converted from the throttle control provided as part of a string trimmer and can include an on/off switch, handle grip, throttle trigger and internal wiring.

The motor mounting bracket 20 can attach the motor assembly 10 to a watercraft. As illustrated in FIG. 1, the bracket 20 can be mounted to the drive shaft 14 between the first and second end. The bracket 20 can feature an adjustable collar or sleeve with a fastener for securing the bracket 20 around the drive shaft 14. The bracket 20 can also feature a notched area with one or more adjustment clamps or bolts 26, 28 and a pivoting body 30 which can enable the motor assembly 10 to be angled relative a vertical plane. When being affixed to a watercraft, a portion of the watercraft, such as for example a lip of the transom, can be placed within the notched area and the adjustment clamps can be tightened to secure the bracket in place.

Figure 2:
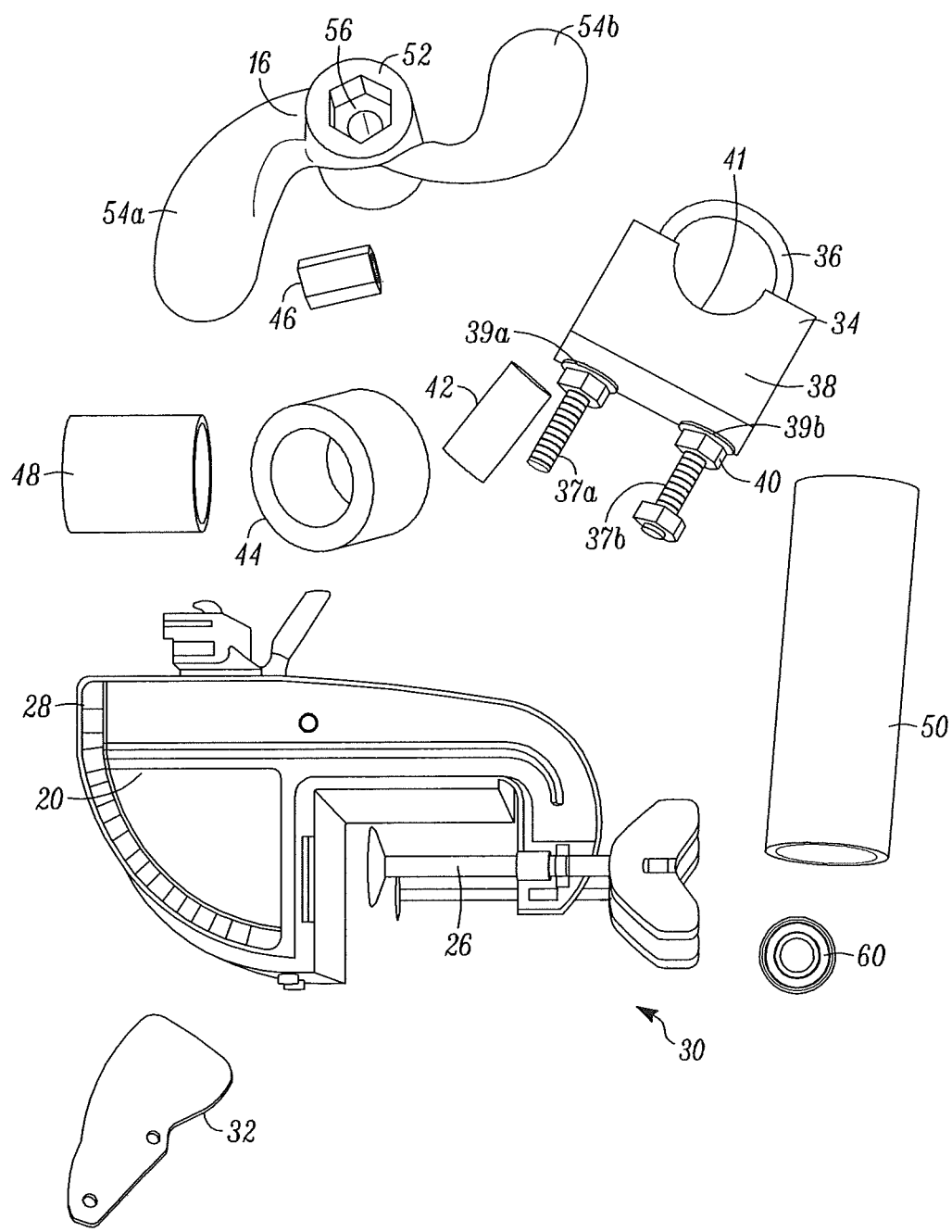
FIG. 2 is a perspective view of components of a conversion kit in unassembled form according to embodiments disclosed herein.

FIG. 2 illustrates components of the conversion kit 30 that can be used to convert a string trimmer into the motor assembly illustrated in FIG. 1. The conversion kit 30 can include for example: an outboard motor mount or propeller 16; a skeg 32; a drive shaft clamp 34, including a stainless steel U-bolt 36, mounting block 38 and fasteners 40; a tube, cap or sleeve 42 made of rubber, silicone or other elastic synthetic material; cylindrical spacers 44, 46, and bushings 48, 50 made of plastic material, such as for example, polyvinyl chloride (PVC), polyethylene or polypropylene, synthetic rubber or polyurethane or other material suitable for isolating, dampening or absorbing vibration. The bushings can have a length and diameter with an interior channel for receiving portions of the drive shaft 14 or steering shaft 18 of the motor assembly 10.

It will be recognized that the conversion kit 30 can include all or only some of the foregoing components, or additional components as desired. For example, the kit 30 can also include a mounting bracket, such as for example the bracket 20 illustrated in FIG. 1 and additional fasteners, including screws, nuts and washers that can be used to assemble the motor assembly 10 from the string trimmer. In addition, the kit 30 can also include an annular sealed clutch bearing 60 which is preferably made of stainless steel and, as described more fully herein, can be used during the conversion process to replace an existing clutch bearing which is typically unsealed and made from a less durable material. Additional items that can be included in the conversion kit 30 include, for example, lithium grease to protect the components from unwanted corrosion and an environmental bag or cover for protection against the damaging effects of sunlight (uv radiation) which can cause the plastic fuel lines of the device to become brittle and crack, and rain which can result in the exhaust port located near the top of the motor to fill with water.

As illustrated in FIG. 2, the propeller 16 can have a centrally located hub 52 with first and second sides, an exterior surface between the first and second sides, and a plurality of blades 54a, 54b radially extending from the exterior surface of the hub 52. The hub 52 can have a centrally-located non-circular bore or recess 56 that can receive a non-cylindrical portion of a prop-shaft. The bore or recess 56 can be broached into the propeller hub 52 and can be shaped to have a plurality of sides and corners, such as for example a hex-shape. The bore or recess 56 can extend partially or completely though the propeller hub 52. Although FIG. 2 illustrates the propeller 16 as having two blades 54a, 54b, it will be understood by persons of ordinary skill in the art that the propeller have additional blades without departing from the novel scope of the subject invention.

Propeller size and attachment integrity have been determined to be significant issues with regard to mounting a propeller to a converted string trimmer. Typical string trimmers have a centrifugal clutch between the motor and attachment drive shaft. Accordingly, a propeller too large will burn the clutch up. In addition, the attachment of the propeller to the prop-shaft must be secure, otherwise under dynamic loads the propeller can break loose. Propeller diameter, hub diameter, the number of blades, and blade pitch can each affect the propeller performance and corresponding engine load. To account for such issues, the propeller 16 according to embodiments presented herein, can have a total diameter on the order of 5.25" with two blades and a central hub 52 sized on the order of less than 2.1" in diameter. It will be recognized, however, that modifications to the proportions of the propeller, including the size, shape, number of blades and/or configuration can be made without departing from novel scope of the subject invention.

In addition, the centrally located hub 52 can feature a broached non-circular recess 56 to ensure positive attachment to the prop-shaft. Embodiments presented herein further feature a solid mount between the propeller 16 and the drive and rely on the centrifugal clutch to absorb impact loads. It has been recognized by the inventor hereof that such a configuration can further protect the propeller, drive shaft or motor from damage.

As illustrated in FIG. 2, the drive shaft clamp 34 can include a U-bolt 36 with spaced apart threaded ends 37a, 37b, a block 38 coupled to the U-bolt 36 and fasteners 40 for securing the block 38 to the U-bolt 36. The block 38 can have spaced apart apertures 39a, 39b extending between a first end and a second end of the block. When assembled, the threaded ends 37a, 37b of the U-bolt 36 can extend through the apertures 39a, 39b in the block 38 and the fasteners 40 can engage the threaded ends 37a, 37b of the U-bolt 36 adjacent the first end of the block. The second end of the block can have a semi-circular slot 41 between and perpendicular to the apertures 39a, 39b. When assembled, the slot 41 and U-bolt 36 can form a substantially annular interior recess for receiving the drive shaft 14.

The skeg 32 provided in kit 30 can have a first and second side and at least one aperture for securing the skeg 32 to the drive shaft 14 or gear box assembly 22. As illustrated in FIG. 2, the skeg 32 can have a fin-shaped configuration to assist in controlling or directing the watercraft across the water, and providing a level of protection to the propeller should the watercraft be run aground.

Figure 3:
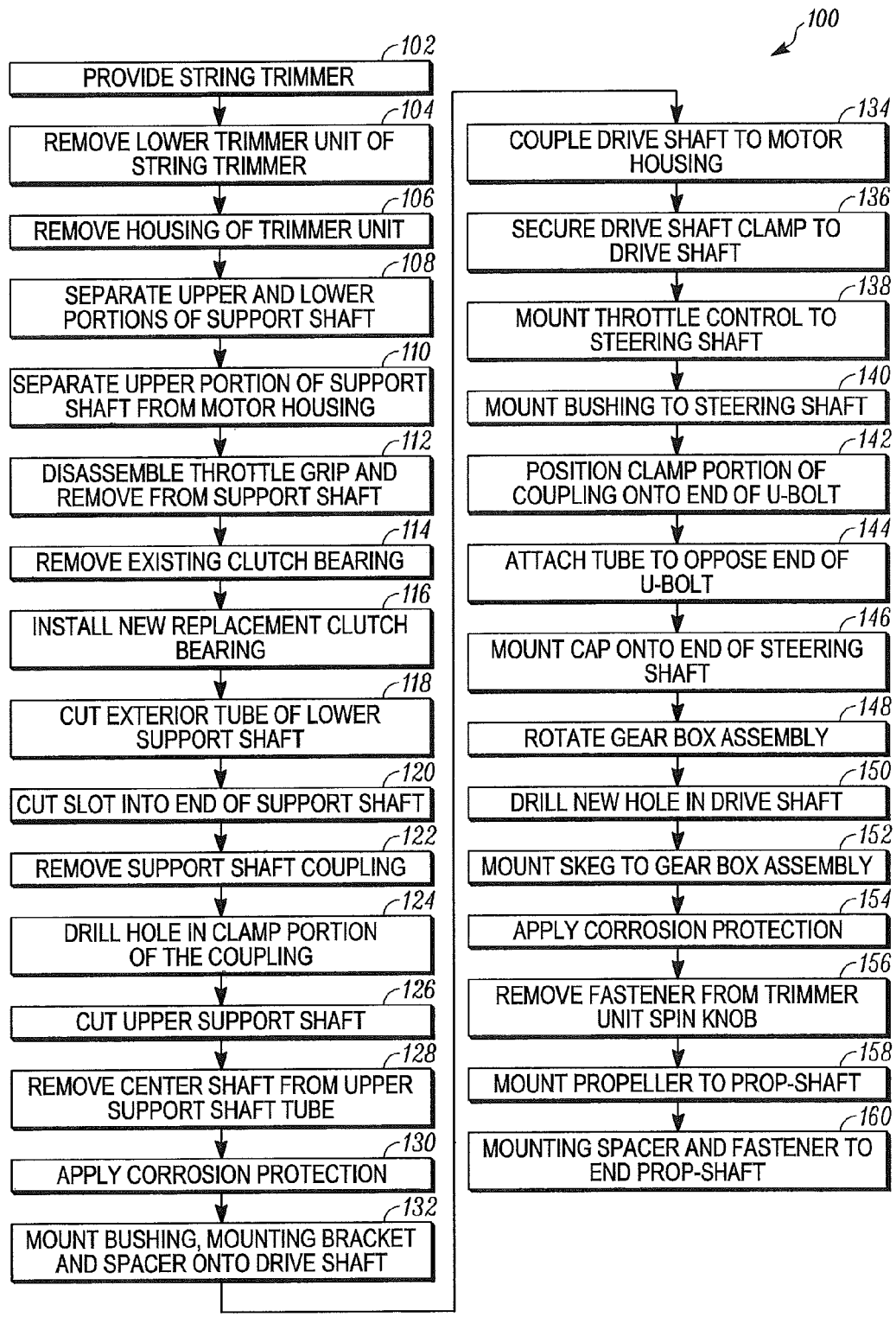
FIG. 3 illustrates a flowchart of a method of constructing an outboard motor assembly according to embodiments disclosed herein.

FIG. 3 illustrates a flowchart of a method 100 of converting a string trimmer into the trolling outboard motor assembly 10. According to this method, a string trimmer having a split straight shaft that is attachment capable can be provided 102 and appropriately modified. In carrying out this process, the lower trimmer unit of the string trimmer can be removed 104 and the housing of the trimmer unit can be removed 106 to expose a fastener or hex nut that can be used later in the process.

Figure 4A:
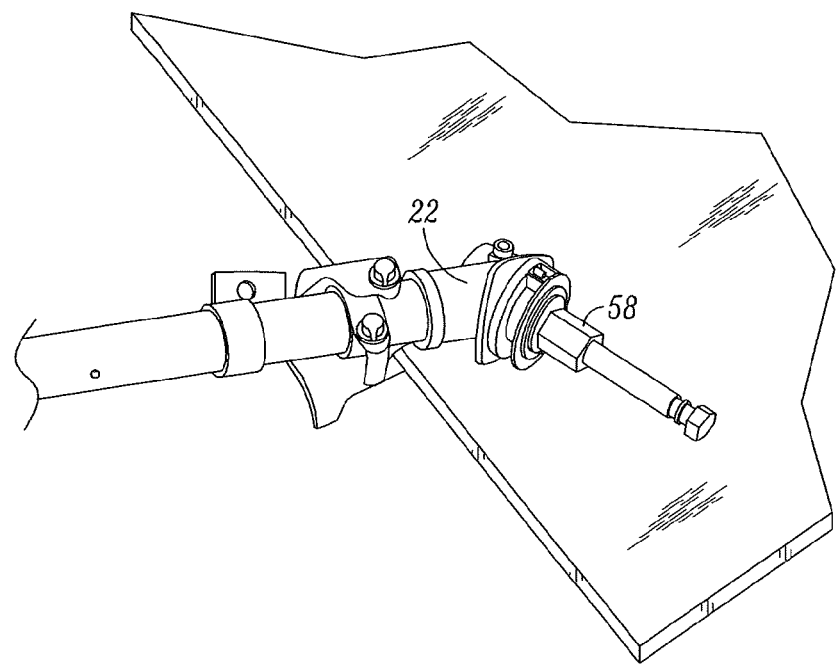
FIG. 4A is detail perspective view of a first portion of a pre-assembled outboard motor assembly during an intermediate stage of the conversion process.

FIG. 4A illustrates a detail prospective view of a portion of a string trimmer with the trimmer unit removed at this intermediate stage of the conversion process. As shown, removal of the trimmer unit can expose the gear box assembly 22 and prop-shaft 58 upon which the propeller 16 can be mounted.

Referring back to the method 100 illustrated in FIG. 3, string trimmers typically have a telescoping elongated support shaft having an upper portion and lower portion that partially slides into the upper portion and can be secured in place by an intermediate coupling. The upper and lower portions of the support shaft can be separated 108 from one another by sliding the lower portion out of the upper portion. According to embodiments presented herein, the lower portion of the support shaft can become the drive shaft 14 of the motor assembly and the upper portion can become the steering shaft 18. The upper portion of the elongated support shaft of the string trimmer can be separated 110 from the adjacent motor housing, typically by loosening a clamping screw and set screw located proximate the clamping screw. The throttle grip of the string trimmer is typically coupled to the upper portion of the support shaft and can be disassembled and removed 112 from the upper portion of the support shaft.

In the event that the string trimmer has a clutch bearing, it is typically not sufficiently durable for use in connection with a trolling motor and can therefore be removed 114 and replaced 116 with a more durable stainless steel bearing 60 (see FIG. 2). The bearing can be removed 114 from the motor housing by removing the lower portion of the motor housing from the engine, removing an outside snap ring located on the clutch shaft, pressing out the centrifugal clutch and removing a second interior snap ring and the original bearing. Once the bearing is removed, it can be replaced 116 with the sealed bearing 60 that is more durable and likely to withstand the additional exertion that can occur from operation as a trolling motor.

In order for the lower portion of the support shaft to better function as the drive shaft 14 for the trolling motor 10, the exterior tube can be shortened or cut 118 to provide for sufficient engagement of the internal drive shaft with the motor. According to the preferred embodiment, approximately 1" of the exterior tube of the lower portion can be cut at the end opposite the gear box assembly 22. A slot can be cut 120 into the exterior tube at the shortened end so that the tube can be secured to the motor housing which has a complimentary ridge. The slot can be cut 120 by cutting two ¾ inch slits about 3/16 of an inch apart and removing the intermediate piece of material between the two slots.

The coupling affixed to the bell-shaped end of the upper portion of the support shaft can be removed 122 by grinding off the knob and threading the fastener out the through hole of the clamp. A hole can be drilled 124 through the side of the clamp opposite the existing through hole. The bell-shaped end of the upper support shaft can be cut 126 and the center shaft can be removed 128 from the outer tube. Alternatively, the motor assembly 10 can be assembled using a single piece support shaft by cutting the shaft into two pieces to form the drive shaft 14 and steering shaft 18.

Once a string trimmer has been disassembled and/or modified as set forth above, it can be assembled together with the kit components to form the motor assembly 10. It is also preferable that some corrosion protection be applied 130 to the drive shaft 14, motor housing and fastener. In applying 130 corrosion protection, a coating of a water-proof material, such as for example lithium grease, can be applied to these components. Lithium grease is a water proof compound and is generally recognized as being an effective rust inhibitor. It is additionally beneficial to peel off any labels affixed to the drive shaft 14 which if left affixed, over time can eventually peel off and interfere with operation of the motor assembly 10.

In assembling the motor assembly 10, bushing 48 mounting bracket 20 and spacer 44 can be slid or mounted 132 onto the lower shaft of the string trimmer (now the drive shaft 14) and the drive shaft 14 can be coupled 134 to the motor housing. To couple 134 the drive shaft 14 to the motor housing, the end of the shaft having the slot can be slid into the housing until it engages the complimentary ridge. A fastener, such as for example a set screw can be used to secure the drive shaft 14 to the motor housing.

The drive shaft clamp 34 can be secured 136 to the drive shaft 14 between the motor 12 and the combination of the bushing 48 mounting bracket 20 and spacer 44. The drive shaft clamp 34 can be secured to the drive shaft 14 such that the drive shaft 14 extends through the space between the U-bolt 36 and the semi-circular slot 41 at the second end of the block 38.

The throttle control 24 can be mounted 138 to the end of the steering shaft 18 opposite the end that was previously shortened or cut off. Bushing 50 can be mounted or slid 140 onto the steering shaft 18 and preferably positioned about 2" from the end opposite the throttle control 24. The coupling C previously removed 122 from the bell-shaped end of the string trimmer's upper support shaft can be slid over the support shaft 18 and positioned so that bushing 50 is between the ring portion of the coupling ring and the support shaft 18. In this position, the bushing 50 can dampen vibration of the motor assembly 1.

The clamp portion of the coupling C can be placed 142 onto one of the threaded ends of the U-bolt 36 by inserting the threaded end through the holes in the clamp and securing the clamp with a fastener, such as for example a lock nut. Tube or cap 42 can be placed 144 over the opposite threaded end of the U-bolt 36. In a preferred embodiment, the clamp can be inserted onto the threaded end of the U-bolt 36 in the aft position. When the coupling C is secured onto the U-bolt the clamp can be extending in a direction away from the engine 12 and the ring portion of the coupling can be perpendicular to the drive shaft 14. The plastic cap that was previously removed from the bottom trimmer unit of the string trimmer can be slid 146 onto the previously shortened end of the steering shaft 18 adjacent bushing 50 and can be secured in place on the steering shaft 18 with a fastener.

Figure 5A:
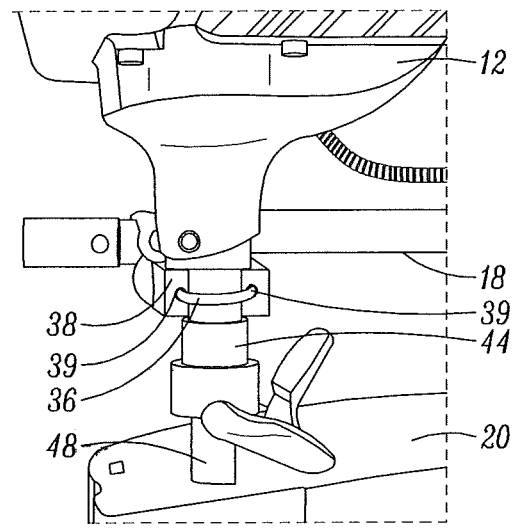
FIG. 5A is a detail first elevational view of a second portion of an outboard motor assembly in assembled form.
Figure 5B:
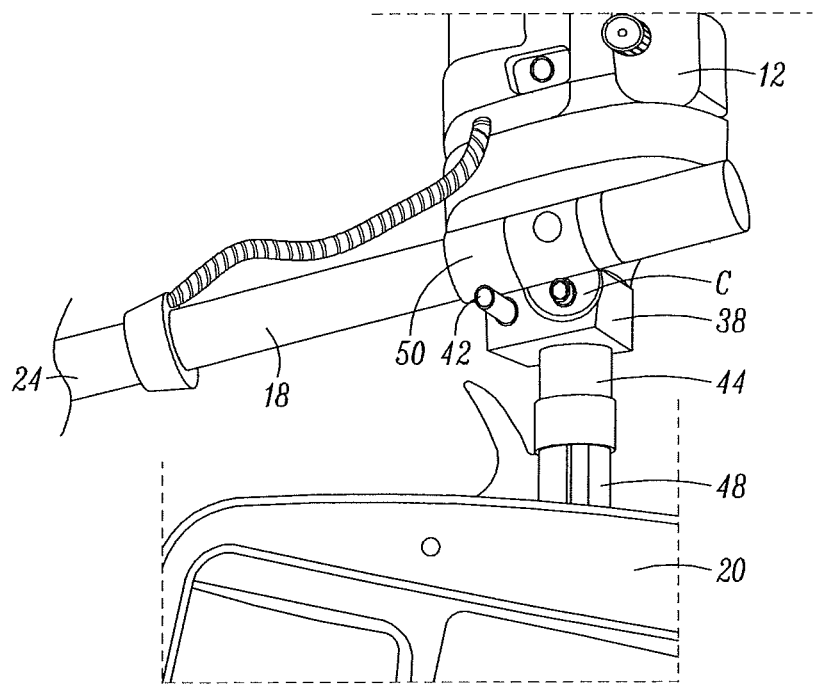
FIG. 5B is a detail second elevational view of the second portion illustrated in FIG. 5A in assembled form.

FIGS. 5A and 5B are opposing side views illustrating the portion of the motor assembly 10 where the steering shaft 18 can be affixed to the drive shaft 14. When the motor assembly 10 is assembled, the steering shaft 18 and drive shaft 14 can be substantially perpendicular to one another. As illustrated in FIGS. 5A and 5B, the drive shaft clamp 34 and the coupling C removed from the end of the upper portion of the string trimmer can couple the steering shaft 18 to the drive shaft 14 adjacent to the location where the drive shaft is coupled to the engine 12. FIGS. 5A and 5B show the detail of this connection with the ring portion of the coupling C secured around the steering shaft 18 and the clamp portion of the coupling C secured to one of the threaded ends 39b of the U-bolt 36. In this arrangement the block 38 of the drive shaft clamp 34 is positioned between the spacer 44 and the steering shaft 18. In addition, spacer 44 is positioned on the drive shaft 14 between the mounting bracket 20 and the drive shaft clamp 34. Thus, the steering shaft 18 when moved side to side is allowed to rotate the drive shaft 14 without interference from the mounting bracket 20.

Referring back to the method illustrated in FIG. 3, the gear box assembly 22 located at the end of the drive shaft 14 opposite the engine 12 can be rotated 148 so that the propshaft 58 extends in a direction substantially 180 degrees away from the throttle control 24 at the end of the steering shaft 18. In rotating 150 the gear box assembly 22, the fasteners securing the gear box 22 can be loosened and the gear box removed from the end of the drive shaft 14 and rotated into the appropriate position.

A new hole can be drilled 150 in end of the drive shaft 14 to accommodate the gear box fasteners in the new position. The skeg 32 can be mounted 152 to the gear box assembly 22 using the fasteners that secure the gear box to the drive shaft. Corrosion protection, such as lithium grease, can be applied 154 to the gear box assembly 22, the end of the drive shaft 14 to which the gear box assembly 22 is secured, and the associated fasteners.

The spin knob previously removed from the string trimmer's trimming unit can have a bolt or fastener inside which can be removed 156 by using a punch or rod to dislodge the fastener through the cover. The propeller 16 can be mounted 156 onto the prop shaft 58 of the gear box assembly 22 so that the non-cylindrical portion of the shaft 58 extends through the non-circular recess or bore 56 on the propeller hub 52. The propeller 16 can be secured into place on the non-cylindrical prop shaft 58 by mounting 156 spacer 46 and the fastener removed from the spin knob to the shaft 58. Spacer 46 can be made of a metal alloy or other durable material and have an interior channel for mounting to a portion of the prop-shaft 58. The interior channel of the spacer 46 can have a cylindrical or non-cylindrical configuration and can be mounted on the prop-shaft either between the gear box assembly 22 and the propeller 16 or adjacent the propeller 16 opposite the gear box 22.

Figure 4B:
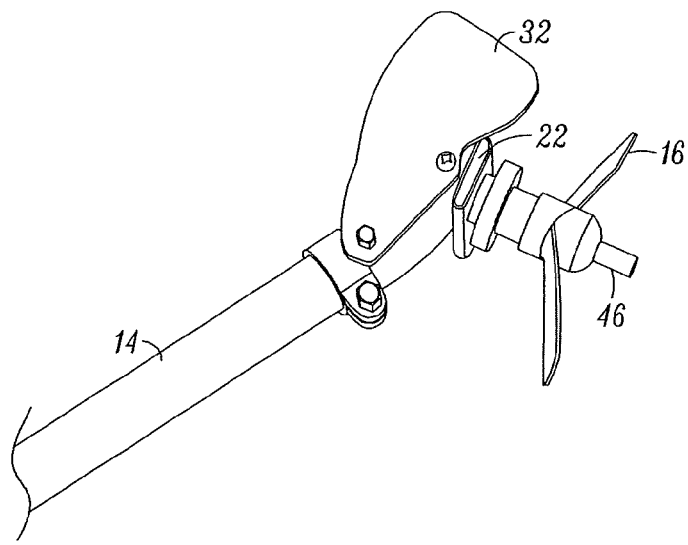
FIG. 4B is a detail perspective view of the first portion illustrated in FIG. 4A in assembled form.

FIG. 4B illustrates an end of the drive shaft 14 of the motor assembly 10 in assembled form with the propeller 16, spacer 26 and skeg 32 secured to the gear box assembly 22 at an end of the drive shaft 14.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

What is claimed is:

1. A method of converting a string trimmer into an outboard trolling motor assembly comprising:
providing a string trimmer having a telescoping straight support shaft connecting an engine to a rotating trimmer unit, the support shaft having first and second portions adjustably secured together by a coupling and a control unit affixed to the first portion of the shaft and each of the first and second portions having an exterior tube;
removing the trimmer unit from a gear box assembly on the second portion of the support shaft;
removing the control unit from the first portion of the support shaft;
removing the coupling affixed to the first portion of the support shaft and removing a knob or fastener from a first side of a clamp portion of the coupling;
cutting a slot into an end of the exterior tube of the second portion of the support shaft;
drilling a hole through a second side of the clamp portion of the coupling;
sliding a drive shaft bushing onto the second portion of the support shaft, the busing having an interior channel for receiving the exterior tube of the second portion of the support shaft;
mounting a motor mounting bracket onto the second portion of the support shaft, the mounting bracket having at least one clamp for removably securing the motor assembly to a watercraft;
sliding a spacer onto the second portion of the support shaft, the mounting bracket positioned between the spacer and the drive shaft bushing;
coupling the second portion of the support shaft to an assembly housing the engine;
securing a drive shaft clamp to the second portion of the support shaft between the assembly housing the engine and the spacer, the drive shaft clamp having a block secured to a U-bolt with threaded ends extending through the block;
sliding the clamp portion of the coupling onto one of threaded ends of the U-bolt and securing the clamp portion onto the U-bolt with a fastener, the block of the drive shaft clamp being positioned between the spacer and a ring portion of the coupling, a ring portion of the coupling extending substantially perpendicular to the second portion of the support shaft;
sliding the first portion of the support shaft through the ring portion of the coupling, the ring portion of the coupling being secured adjacent a proximal end of the first portion of the support shaft;
mounting the control unit to a distal end of the first portion of the support shaft opposite the proximal end;
rotating and securing the gear box assembly into a position so that a rotating shaft of the gear box extends in a direction away from the control unit;
mounting a propeller to the rotating shaft of the gear box, the propeller having a central hub having a non-cylindrical bore for receiving a non-cylindrical portion of the rotating shaft of the gear box; and
affixing a skeg to the assembly proximate the propeller.

2. The method of claim 1 which includes removing a clutch bearing of the string trimmer and replacing the clutch bearing with a sealed bearing.

3. The method of claim 1 which includes cutting the exterior tube at one end of the second portion of the support shaft.

4. The method of claim 1 which includes cutting the exterior tube at one end of the first portion of the support shaft.

5. The method of claim 1 which includes applying corrosion protection to the motor assembly.

6. The method of claim 1 which includes mounting a steering shaft bushing to the first portion of the support shaft and securing the ring portion of the coupling around the steering shaft bushing.

7. The method of claim 1 which includes affixing a cap to the threaded end of the U-bolt opposite the end with the clamp portion of the coupling.

8. The method of claim 1 which includes affixing a cap removed from the trimmer unit onto the proximal end of the first portion of the support shaft, the cap secured to first portion of the support shaft adjacent the ring portion of the coupling.

9. The method of claim 1 where rotating and securing the gear box assembly comprises removing fasteners securing the gear box to the second portion of the support shaft and drilling a new hole into the second portion of the support shaft, the new hole to accommodate a fastener to secure the gear box in the position.

10. The method of claim 1 which includes affixing at least one spacer to the shaft of the gear box adjacent the propeller.

11. The method of claim 1 which includes removing a fastener from the trimmer unit and affixing the fastener to an end of the shaft of the gear box.

12. The method of claim 1 which includes broaching a non-cylindrical bore into the hub of the propeller.

13. An outboard marine trolling motor comprising:
a string trimmer portion, the string trimmer portion having an engine, a control throttle unit, a gear box with a shaft having a non-cylindrical shape along a portion of its length, a coupling having a clamp portion and a ring portion, a first support shaft having an outer tube and central drive shaft and a second support shaft having an outer tube;

a propeller having a centrally located hub with first and second sides, an exterior surface between the first and second sides, and a plurality of blades radially extending from the exterior surface of the hub, the hub having a substantially centered non-circular channel suitable for being axially mounted onto the non-circular portion of the gear box shaft;

a clamp assembly having a U-bolt with spaced apart threaded ends, a block having first and second ends and spaced apart apertures extending through the block from the first end to the second end, the threaded ends of the U-bolt extending through the apertures securing the block to the U-bolt, the second end of the block having a semi-circular slot between the apertures, the slot and U-bolt forming a substantially annular interior recess for being secured around a portion of the outer tube of the first support shaft;

a mounting bracket for securing the motor to a watercraft, the bracket having a pivotable body secured to the outer tube of the first support shaft and at least one adjustable clamp; and the clamp portion of the coupling secured to one of the threaded ends of the U-bolt and the ring portion of the coupling secured around the outer tube of the second support shaft.

14. The outboard marine trolling motor of claim 13 which includes a sealed stainless steel clutch bearing.

15. The outboard marine trolling motor of claim 13 which includes a spacer having an interior channel for receiving the first support shaft, the spacer being positioned between the drive shaft clamp and the mounting bracket.

16. The outboard marine trolling motor of claim 13 where the channel formed in the propeller hub is a substantially hexagonal-shaped bore broached into the hub.

* * * * *